United States Patent Office 3,702,308
Patented Nov. 7, 1972

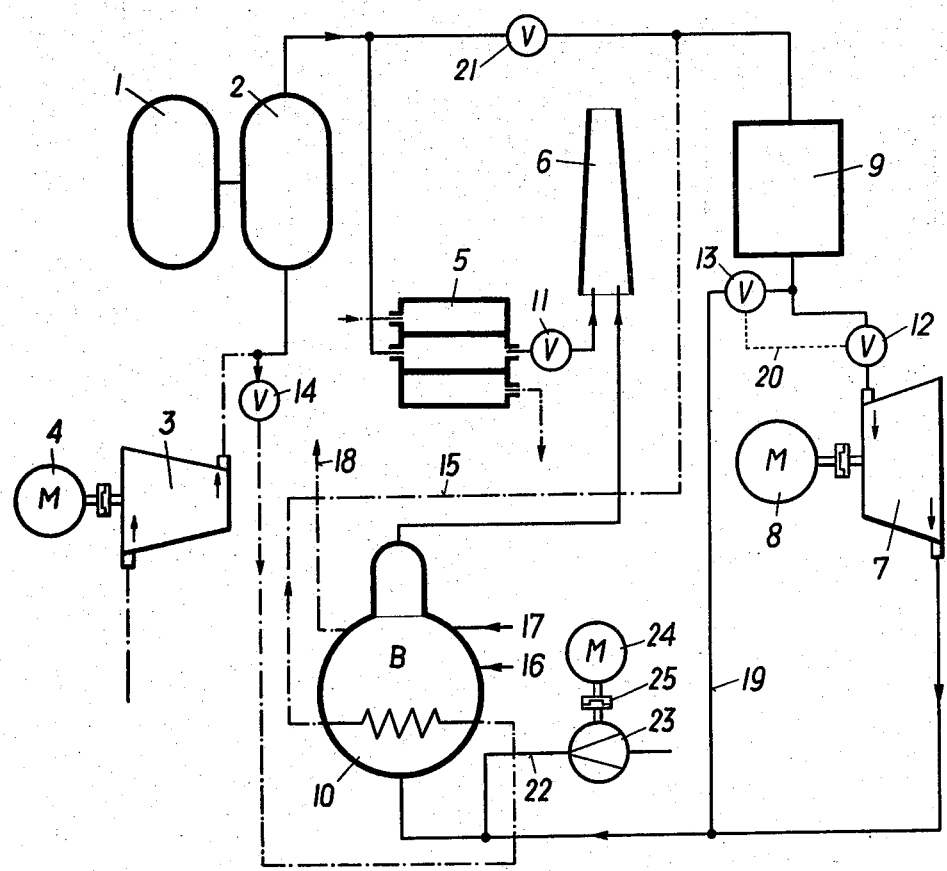

3,702,308
PROCESS FOR THE UTILIZATION OF THE ENERGY CONTENT OF THE FLUE GAS ACCRUED IN CATALYTIC CRACKING PLANTS
Erich Bauer, Eggendorf, and Franz Reichard and Ferdinand Schwarz, Vienna, Austria, assignors to Osterreichische Mineralolverwaltung Aktiengesellschaft, Vienna, Austria
Filed Aug. 18, 1970, Ser. No. 64,670
Int. Cl. B01j 11/68; C10g 11/18
U.S. Cl. 252—417
4 Claims

ABSTRACT OF THE DISCLOSURE

An improvement in a process for utilization of the energy content of the flue gas accrued in catalytic cracking plants and for the economic control of such cracking plants, to thereby improve the entire effectiveness of such a plant and its adaptability to various operating conditions. The process comprises the steps of supplying the combustion air required for the regeneration of the catalyst to the regenerator by a compressor, supplying the accrued flue gas to an exhaust gas turbine by a cyclone being independent of said regenerator, said exhaust gas turbine is arranged particularly to drive a generator, burning the combustible part of CO contained in the flue gas in a catalytic CO boiler following the turbine, supplying the surplus air resulting from a slighter requirement of combustion air for heating to said CO boiler by means of a line (bypass line) leading past the cracking process and branching off between said compressor and said regenerator and mixing said surplus air to the flue gas coming from the regenerator before said cyclone.

The invention generally relates to a process for utilization of the energy content of the flue gas accrued in catalytic cracking plants and to the economic control of such cracking plants.

Among the chemical processes having an exothermic flow course, the catalytic cracking process for the production of gasoline takes up a special position insofar as in burning the oil coke storing up at the catalyst which takes place in the so-called regenerator, there accrues flue gas with a temperature of 620 degrees Celsius, at pressures between 1.3 and 1.8 atü. and a CO content of 4 to 10%, in effect, an exhaust gas with a considerable energy content. Efforts are therefore made to recover as large a part as possible of the energy contained in the flue gas produced during the cracking process. Thus, the flue gas coming from the regenerator is led, before being blown out of the chimney, through a heating boiler, that is to say, a type of heat exchanger, in which the flue gas is used for steam production and is cooled off at the same time. The pressure in this type of conventional plant is regulated by a control valve which is located in the flue gas line downstream of the heating boiler and which is adapted to the operating conditions, or, respectively, to the operating requirements. After passing through the control valve, the flue gas is vented across a sound absorber and a chimney to the atmosphere. This type of energy recovery and control of the cracking plant is not fully satisfactory, however, because on the one hand the energy recovery in the heating boiler mentioned is not completely effective, since, although a large part of the heat can be extracted from the flue gas, the latent energy in the combustible part of the CO is totally lost and, on the other hand, the control valve, which is arranged in the erosive flue gas stream, is an element especially susceptible to operating difficulties, whose necessary cooperation with the control of the compressor supplying the combustion air, under the frequently changing process conditions, is also quite problematic. The output of considerable amounts of CO is also undesirable, for reasons of keeping the air clean. In addition, the flue gas notwithstanding the cyclones which are generally provided in the regenerator, still conveys with it catalyst material which is lost, and which contributes to air pollution.

The object of the invention is to avoid the disadvantages of the conventional energy recovery generated during the flue gas from cracking processes and to improve the overall effectiveness of such a plant and its adaptability to various operating conditions.

For this purpose the present invention provides an improved process for the utilization of the energy content of flue gas accrued in catalytic cracking plants and for the economic control of such cracking plants, with the process comprising the steps of supplying the combustion air required for the regeneration of the catalyst to the regenerator by a compressor, supplying the accrued flue gas to an exhaust gas turbine by means for a cyclone which is independent of the regenerator, burning the combustible part of CO contained in the flue gas in a catalytic CO boiler which is connected to the outlet of the turbine, supplying the surplus air resulting from a lower requirement of combustion air for heating to the CO boiler by means of a line by-passing the cracking process and which branches off between the compressor and the generator, and mixing the surplus air with the flue gas coming from the generator upstream of the cyclone.

The invention is fully disclosed by way of example in the following description and in the accompanying drawing.

In the drawing, the reactor and the regenerator of a catalytic cracking plant, respectively, are indicated as 1 and 2, the turbo compressor for delivering the combustion air for the regeneration of the catalyst is indicated as 3 and the driving machine, which is generally a non-synchronized motor, as 4. In conventional cracking plants, the flue gas emanating from the regenerator is led through a heating boiler 5 (heat exchanger), which is usually provided for steam generation, and through a control valve 11 to a chimney and thus vented into the atmosphere. In the process according to the invention, in contrast thereto, the flue gas emanating from the regenerator 2 is led to a cyclone 9 in order to further eliminate solid particles contained in the flue gas (particularly catalytic material), and from there to an exhaust gas turbine 7 which is usually connected to a non-synchronized generator or other type of machine. In the exhaust turbine 7, the flue gas entering with pressures of between 1.3 and 1.8 atm. is expanded to a large extent and thus also cooled off. Thus, its energy content is converted into electrical or mechanical energy which can be utilized for the internal requirements of the plant. The intake valve of turbine 7 is indicated at 12, which in the plant according to the invention merely serves the purpose of functioning as a safety valve (quickclosing valve), since valve control of the turbine in the conventional way, according to the connections to be explained in detail hereinbelow, is not required. According to the invention, the expanded flue gas exiting from turbine 7 is then supplied to a catalytically operating CO boiler 10 in which the carbon monoxide, contained in the flue gas in rather large amounts (namely 4 to 10%), is burned. The flue gas leaving the CO boiler 10, having been purified of its CO content, is then led or vented into the atmosphere via the chimney 6. A further feature of the process of the invention consists of in that a line 15 branches off from the line of compressed air leading from the turbo compressor 3 to the cracking process (meaning directly into the regenerator 2) through which, controlled by a valve 14 which is located therein, a part of the air supplied by the compressor 3 can be by-passed by the CO boiler 10 past the chemical process. This bypass line 15 opens into the flue gas line coming from regenerator 2 just upstream of cyclone 9. In a similar manner, a line 19, through which the flue-gas-air-mixture can be by-passed relative to the turbine 7 when the valve 13 is opened, branches off downstream of cyclone 9 and upstream of the intake valve 12. The line 19 has an outlet just upstream of CO boiler 10 connecting into the flue gas line leading into chimney 6. The heat generated in CO boiler 10, to the extent it is not needed for heating of the bypass air, is used for other purposes, such as the generation of steam, which is indicated in the drawing by the boiler water supply line 17, or, respectively, by the steam line 18. If necessary, the heating value of the flue gas may be increased in the CO boiler 10 by adding appropriate quantities of heating gas. This possibility is indicated in the drawing by the heating gas line 16. If the oxygen content of the bypass air is not sufficient for an effective catalytic combustion of CO, there is the possibility of supplying outside air into the CO boiler 10 which is indicated in the drawing by line 22, a fan 23 and a drive means 24 for the fan. The fan or blower 23 is connected to the drive means 24 by a clutch 25.

Operation of the cracking plant with energy recovery according to the invention is as follows: The turbo compressor 3 runs at a constant supplying capacity given by the maximum requirement of combustion air in the cracking plant; it can thus always be operated with greatest effectiveness. The surplus of compressed air produced in response to the capacity of the cracking plant not being fully utilized, or, respectively, from a different type of operation (f.i. conversion) is passed by the cracking process through the bypass line 15, which is controlled by valve 14. The accured surplus air is heated in the CO boiler from about 200 degrees Celsius to 600 degrees Celsius (corresponding approximately to the temperature of the flue gas coming from regenerator 2) and is then conveyed back into the flue gas stream just upstream of cyclone 9. This, primarily, has the advantage, as previously mentioned, that the compressor may always be operated with the greatest efficiency without, e.g., having to work with guide blade adjustment, so that the cyclone plant 9 and the exhaust turbine 7 are always supplied with the same quantities and may thereby operate at optimum efficiency without the provision of complicated regulating devices, even when the cracking plant is operated under greatly fluctuating load. The control of the combustion air supplied to the regenerator 2 is thereby effected by the valve 14, the latter being a control means which is supplied with pure air and accordingly, in contrast with valve 11, which is located in the erosive flue gas stream, is much less endangered and much safer in operation. The oxygen content of the bypass air supplied to the flue gas through line 15 is beneficial to the CO combustion in the boiler 10 which can also be controlled by the addition of heating gas or outside air, previously mentioned in such a manner that the flue gas escaping through chimney 6 contains virtually no CO. Thus, if the process according to the invention is followed, not only an energy recovery with a very good efficiency from the flue gas accured in cracking plants may be obtained, but, in addition, air pollution, particularly by the CO contained in the flue gas, is effectively prevented. The constant optimum operation of the cyclone 9, as mentioned previously, also offers good protection of the turbine 7 which is connected to its outlet, from erosion by solid particles contained in the flue gas. There is also provided the possibility of reintroducing into the process the catalyst material accurred in cyclone 9. By appropriate control of the steam generation in CO boiler 10, or, respectively, measured dosage of the admixture of heating gas, or, as the case may be, outside air, the temperature of the surplus air may be regulated so that not only the supply to cyclone 9 and the exhaust gas turbine 7, which is connected to its outlet, but also the intake temperature of the flue-gas-air-mixture can be maintained constant, whereby at least for stationary operation, the hazards brought about by temperature fluctuations in the flux may be largely eliminated. In the event of troubles with the electrical part of the plant (actuating of the protective devices of the generator), or in the event of defects in the turbine, the flue-gas-air-mixture may be by-passed relative to the turbine 7 through line 19. For this purpose, the valves 12 and 13 are connected in such a manner (indicated in the drawing by the dotted line 20) that closing of valve 12 causes immediate opening of valve 13, and vice versa. Thus, when line 19 is open, any gain of electrical or mechanical energy from the flue gas is lost while the other advantages (constant efficiency of the compressor 3 and cyclone 9, useful elimination of CO content of the flue gas in boiler 10 and good controllability of the compressed air to be added to the cracking process) are maintained. Finally, in the event of a failure which also puts the cyclone 9 or the CO boiler 10 out of operation, or when corrective work in the energy recovery plant, is required, so as to maintain some degree of emergency operation, a further valve 21 may be provided between the flue gas line branch to the heat exchanger 5 and the outlet into the bypass line 15, whereby after closing of valve 21 and control valve 14, the flue gas outlet may still be effected through heat exchanger 5 and under control by valve 11.

Although a specific embodiment of the invention has been illustrated and described, it will be understood that various alterations in the details of the process may be made without departing from the scope of the invention.

We claim:

1. A process for the utilization of the energy content of the flue gas accured in catalytic cracking plants and for the economic control of such cracking plants, comprising the steps of supplying combustion air required for the regeneration of the catalyst to the regenerator by a compressor, supplying the accured flue gas through a cyclone which is independent of said regenerator to an exhaust gas turbine, burning the combustible CO of the flue gas in a catalytic CO boiler downstream of said turbine, indirectly heating surplus air resulting from a lowered requirement of combustion air in said CO boiler, and then mixing said heated surplus air with the flue gas upstream of said cyclone while controlling the heated surplus air temperature.

2. A process according to claim 1, comprising the step of controlling the amount of said surplus air before said surplus air is subjected to the step of heating, said control being performed at constant delivery of the compressor by means of a valve which is controlled in dependence of the requirement of combustion air resulting from the loading condition for the time being of the cracking plant and also partly in dependence upon the raw material to be processed.

3. A process according to claim 1, further comprising the steps of heating said CO boiler additionally by a heating gas.

4. A process according to claim 1, further comprising the step of controlling the heating of said surplus air which goes through the CO boiler in such a manner so that, each load condition of the plant, the temperature of the flue-gas-air-mixture entering into said cyclone and then into said turbine is maintained substantially constant for a predetermined operative condition of the plant.

References Cited

UNITED STATES PATENTS

| | | | |
|---|---|---|---|
| 3,076,769 | 2/1963 | Pfeiffer | 208—113 X |
| 3,532,620 | 10/1970 | Asmus et al. | 208—113 |
| 3,012,962 | 12/1961 | Dygert | 208—164 X |
| 3,247,129 | 4/1966 | Roelofsen et al. | 252—417 |

DELBERT E. GANTZ, Primary Examiner
G. E. SCHMITKONS, Assistant Examiner

U.S. Cl. X.R.
208—113, 164